T. SHREWSBURY.

Improvement in Lathe-Chucks.

No. 132,109.    Patented Oct. 8, 1872.

UNITED STATES PATENT OFFICE.

TOM SHREWSBURY, OF CAMDEN, NEW JERSEY.

IMPROVEMENT IN LATHE-CHUCKS.

Specification forming part of Letters Patent No. 132,109, dated October 8, 1872.

*To all whom it may concern:*

Be it known that I, TOM SHREWSBURY, of Camden, in the county of Camden and State of New Jersey, have invented a new and useful Improvement in Universal Chucks; and I do hereby declare the following to be a full, clear, and exact description thereof, which will enable those skilled in the art to make and use the same, reference being had to the accompanying drawing forming part of this specification, in which drawing—

Figure 1:
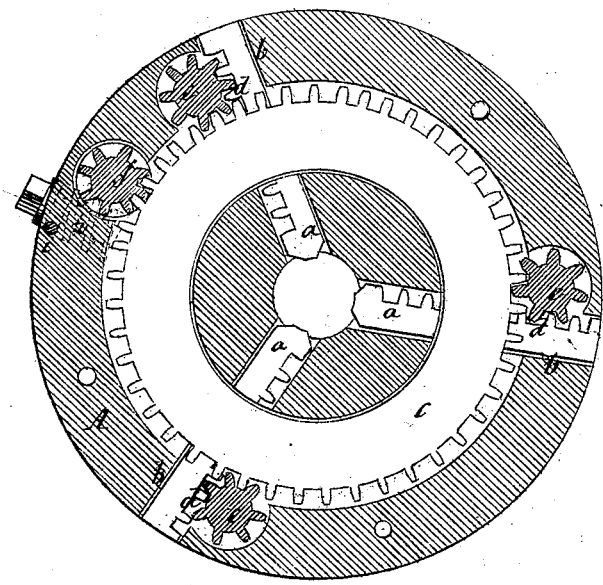
Figure 2:
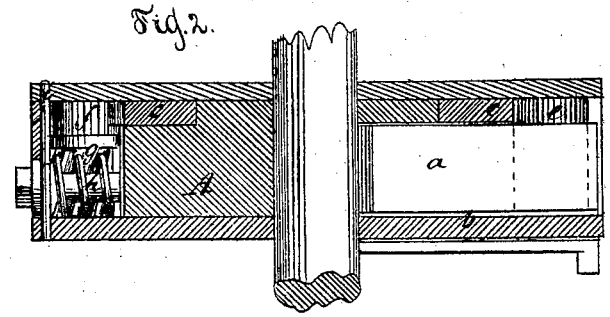

Figure 1 represents a sectional rear view of my invention, and Fig. 2 is a transverse section of the same.

Similar letters indicate corresponding parts.

This invention has for its object the production of a chuck which will be of simple construction, effective, and powerful in use; and to such an end it consists in combining with the toothed radial jaws and their operating-pinions a spur-wheel loosely arranged in a recess in the body of the chuck, said spur-wheel being operated by a worm and worm-wheel in such a manner that by turning the worm said jaws can be moved in either direction with great force; and, furthermore, after the jaws have been brought in the desired position they are locked by the worm and thus enabled to grasp the article placed in the chuck with great tenacity.

In the drawing, the letter A designates my chuck, which contains three jaws, *a*, fitted into radial guide-grooves *b*. Each of these jaws is geared together with a central master-wheel, *c*, either by racks *d* and pinions *e*, or by any other desirable manner, such as a scroll and corresponding teeth on the jaws. In the example shown in the drawing each of the jaws is provided on one of its edges with a toothed rack to engage with a pinion, which also meshes into the cogs of the master-wheel. Said master-wheel is placed loosely into an annular recess in the body of the chuck, and it is made in the form of a ring, so that my chuck can be provided with a large central opening to admit tubes, pipes, rods, or other articles of a large diameter.

It will be readily seen from the above description that by turning the master-wheel all the jaws receive a uniform motion in a radial direction, whereby they can be made to close up against an article placed between them, or to spread against the inner surface of a pulley or other article which is to be turned off on its face; or, if desired, my chuck can also be used for cutting screw-threads on pipes, rods, or other articles.

The master-wheel *c* receives its motion by means of a pinion, *f*, which is made in one piece with or firmly connected to a worm-wheel, *g*, that engages with a worm-screw, *h*. This worm-screw is dropped loosely in a radial socket in the body of the chuck, and it is held in position by a pin, *i*, which passes through an annular groove in the neck of the worm-screw. The head of said worm-screw is square or otherwise formed so that it can be readily grasped with a wrench or other device.

By turning the worm-screw a slow and powerful motion is imparted to the master-wheel and the jaws are opened or closed simultaneously. When the jaws have closed up against the article to be retained in the chuck the worm and worm-wheel lock the same firmly in position, and the article held in the chuck is not liable to work loose.

What I claim as new, and desire to secure by Letters Patent, is—

The toothed radial jaws *a* and their pinions *e*, in combination with the pinion *f*, worm *h*, worm-wheel *g*, and wheel *c*, all arranged and operating substantially as herein shown, for the purpose specified.

TOM SHREWSBURY.

Witnesses:
 W. HAUFF,
 ROBT. SHREWSBURY.